United States Patent [19]

Diei et al.

[11] Patent Number: 5,319,357
[45] Date of Patent: Jun. 7, 1994

[54] METAL CUTTING TOOL FAILURE EVENT SENSOR

[75] Inventors: Edward N. Diei, Cincinnati; Jerry H. Carmichael, West Chester, both of Ohio; Steven R. Hayashi, Schenectady, N.Y.

[73] Assignee: General Electric Company, Cincinnati, Ohio

[21] Appl. No.: 895,320

[22] Filed: Jun. 8, 1992

[51] Int. Cl.⁵ ............................................. G08B 21/00
[52] U.S. Cl. .................................. 340/680; 73/104; 73/660; 364/474.17
[58] Field of Search ................ 340/680, 683; 73/104, 73/660; 364/508, 474.17, 551.02

[56] References Cited

U.S. PATENT DOCUMENTS

| | | | |
|---|---|---|---|
| 3,548,648 | 12/1970 | Weichbrodt et al. | 73/104 |
| 4,120,196 | 10/1978 | Hamilton et al. | 73/104 |
| 4,220,995 | 9/1980 | Shoda | 364/508 |
| 4,558,311 | 12/1985 | Forsgren et al. | 340/680 |
| 4,559,600 | 12/1985 | Rao | 364/474.17 |
| 4,615,216 | 10/1986 | Vykoupil | 73/593 |
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |
| 4,744,242 | 5/1988 | Anderson et al. | 73/104 |
| 4,831,365 | 5/1989 | Thomas et al. | 340/680 |
| 4,918,427 | 4/1990 | Thomas et al. | 340/680 |
| 5,266,929 | 11/1993 | Carmichael et al. | 340/680 |

*Primary Examiner*—Thomas Mullen
*Attorney, Agent, or Firm*—Jerome C Squillaro; Charles L. Moore, Jr.

[57] ABSTRACT

Breaking of a cutter insert in a multiple insert metal cutter is detected by selecting a periodic vibration generated electrical signal having components which track individual insert contribution. These components are filtered to provide RMS values whose predetermined ratio values indicate insert breakage.

11 Claims, 6 Drawing Sheets

METAL CUTTING TOOL FAILURE EVENT SENSOR

BACKGROUND OF THE INVENTION

This invention relates to a metal cutting tool failure event sensor, and more particularly to a metal cutting tool failure monitoring system which indicates an early tool failure event such as breakage of one insert in a multi insert cutting tool or a missing insert.

In metal machining operations such as milling, drilling and reaming where the cutter tool includes a plurality of cutter insert elements arranged circumferentially about a rotary tool, a failure of one cutter element may impose a severe cutting load on the remaining elements leading to increased likelihood of breakage of remaining cutter elements and potential total breakdown of a tool and its specific cutting process. A cutting tool failure event monitoring system which is primarily effective to determine only excessive tool wear or total tool breakdown does not provide a timely signal or indication that perhaps one or more of the individual cutter elements may be broken. A timely signal of a failure event which is a precursor to a potential total tool failure, for example, a breakage of one element in a multi element tool will provide for appropriate remedial cost containment action such as, for example, replacing a broken one of a number of a individual cutter elements on a tool before the broken one causes a cascading action of breakage of the remaining cutter elements, or, replacing a worn cutter element to restore or stabilize the cutting efficiency of the tool or cutting process. Metal cutting tools may comprise a tool holder with plural individual inserts or elements mounted on the holder to perform the cutting process. Other metal cutting tools such as milling cutters may include a generally cylindrical body having a plurality of spiral or helical flutes formed axially along and equally spaced circumferentially on the body. Such flutes may define a plurality of end face sequential cutting edges or surfaces. Failure of a cutting edge, whether it be an insert or flute, in a multi cutting edge tool is difficult to detect in a timely manner, and lack of detection can lead to catastrophic tool failure and deleterious economic consequences.

OBJECTS OF THE INVENTION

It is an object of this invention to provide an improved metal cutting tool failure event monitoring system.

It is another object of this invention to provide an improved multi metal cutting edge tool failure event monitoring system which provides an improved signal of the first failure of one cutting edge of the tool.

It is a further object of this invention to provide an improved metal cutting tool failure event monitoring system utilizing perturbations in a base cutter tool vibration signal to detect cutting tool failure events during the tool cutting process.

It is a still further object of this invention to provide an improved metal cutting tool failure event monitoring system utilizing electrical signals generated by tool vibration which are measured and analyzed with associated high signal resolution to timely detect a cutter element breakage prior to total tool failure.

SUMMARY OF THE INVENTION

Cutting tool forced vibration in a metal cutting machine tool is converted into a low frequency base electrical signal having adequate resolution to track the contribution of each cutting edge or insert in a multi cutting edge tool. The electrical signal is processed by an electronic filter circuit to isolate and analyze a residual electrical signal which includes most of the cutting signal of a defective tool. Predetermined root mean square ratio values of certain filtered components of the residual signal are recognized as indicative of a tool failure event such as a cutting edge or insert breakage.

These and other advantages and objects of this invention will be best described when taken in connection with the following drawings and their description.

DESCRIPTION OF ONE PREFERRED EMBODIMENT

Metal removal or machining operations involving the use of cutting tools 100 with multiple cutting edges 103 or cutter inserts 102 such as milling cutters, drills, reamers, etc. generate certain failure characteristics. For example, during the cutting process one of the inserts 102 or cutting edges 103 may fail and its failure will impose its cutting requirement on the next insert in the cutting sequence which quite often overburdens the next insert with its resultant failure. Uncontrolled, the described condition may quickly lead to cascading of cutting edge or insert failures with a catastrophic failure of the cutting tool 100. Machining with a multi cutting edge or insert tool is also characterized by a variable tool load as each cutting edge enters the metal to be cut, then attains its full cutting feed and exits from the metal. In a rotary cutting tool 100 the described sequence is repeated during each revolution of the cutting tool 100 and represents a periodic force in the cutting machine 106 and spindle 104 in which the cutting tool is mounted. Also, this periodic force generates a forced vibration in the machine 106 as known in the art. This forced vibration may be utilized to generate a base low frequency electrical signal which is expeditiously utilized in this invention to detect a failure event in a metal machining process. For example, when an insert 102 or cutting edge 103 of the cutting tool 100 is broken, the described low frequency vibration signal is perturbed. A part of this perturbation is directly related to a failure event occurrence in the cutting tool 100 such as breakage of one cutting edge or insert 102 in a multi cutting edge tool 100. Accordingly, the low frequency electrical vibration base signal may be processed and analyzed in a proscribed system and manner to detect tool deficiency and the specific failure event that caused the signal perturbation. In general, a normal cut of a cutting tool represents a continuous and constant cutting action without significant interruptions or aberrations. The electrical signal from this normal cut is dominated by the first two harmonics of the "tooth" frequency, i.e. spindle frequency multiplied by the number of inserts or cutting edges. In contradistinction, the electrical signal from a cutting process with a tool having a broken or missing insert or cutting edge is dominated by harmonics of the spindle frequency. Therefore, by passing the signal from the cutting process through a multi notch filter with notches at the first and second harmonics of the "tooth" frequency, a residual signal is isolated. This residual signal contains mostly low amplitude noise of a normal cut but retains most of the cutting signal generated by a damaged tool with broken insert or cutting edge. The ratio of the root-mean-squared (RMS) value of the residual signal to that of the original signal is small (equal to or less than 45%) for normal cuts, but large, (equal to or greater than 75%) for cuts with a broken tool. The foregoing ratios and their contributing factors are utilized in an electrical signal processing system of this invention to detect a cutting tool failure event and provide a concurrent warning or alarm signal. Ordinarily, the base electrical signal is derived from the cutter tool rotation in a workpiece. For example, an accelerometer 108 with flat response in the low frequency region of from about 5 to about 1000 Hz. is mounted at a convenient machine location such as on the spindle housing 110 in which the rotating cutting tool is mounted, or on the workpiece fixture which restrains the workpiece on which the cutting process is practiced. The base low frequency signal from the accelerometer 108 is passed through a signal processing and analyzing system to provide an electric signal indicative of a rotary cutting tool failure event. Such a signal may be an audio/visual warning or alarm signal, or may be effectively utilized to institute automatic control measures in the machine.

Figure 1:
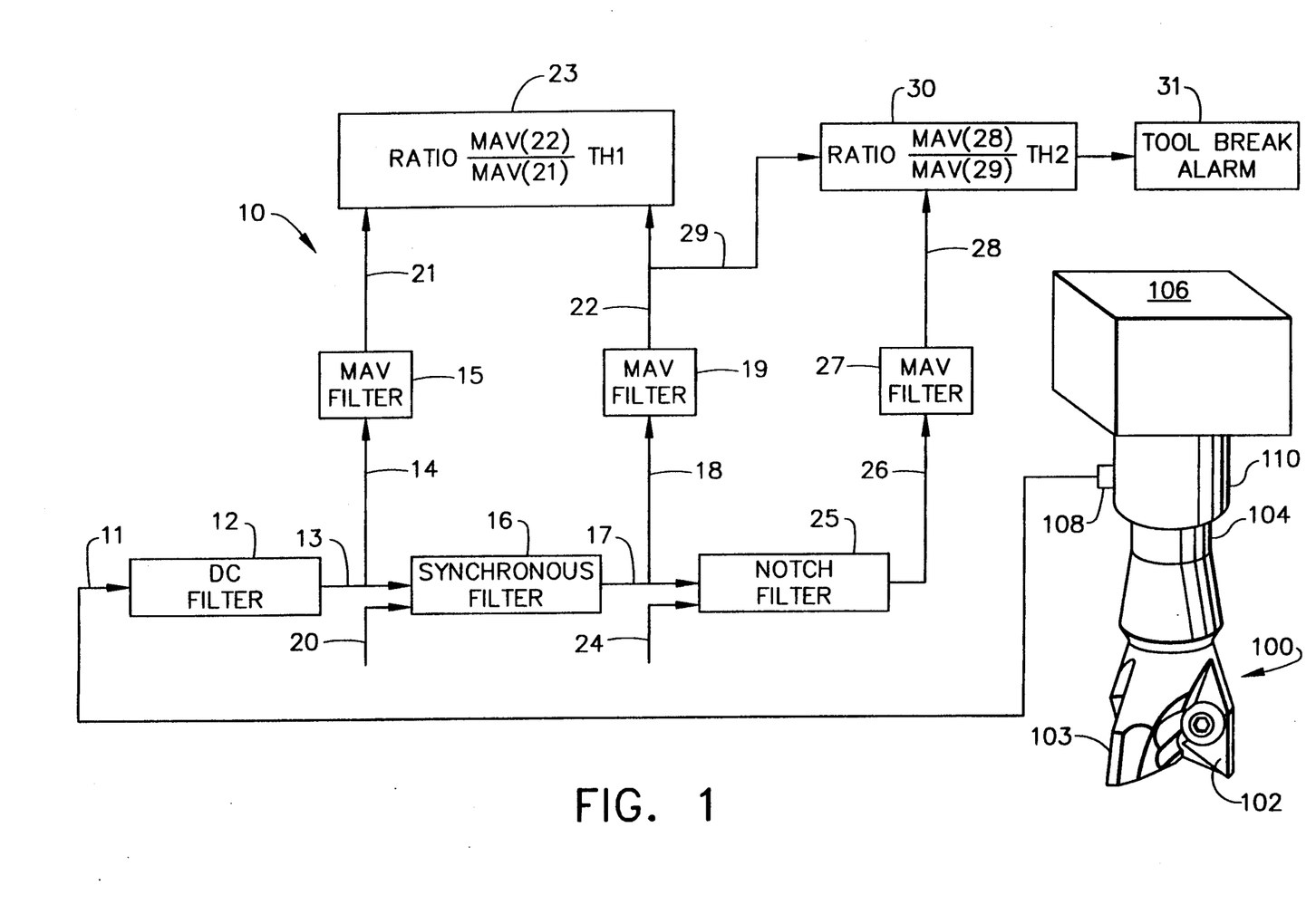
FIG. 1 is a schematic and block diagram of interconnected electrical components in the monitoring system of this invention.

FIG. 1 is a block diagram of a processing system 10 and its components which are utilized to process the described base low frequency electrical signal to provide clear and timely indications of a tool failure event.

Referring to FIG. 1, a low frequency electrical vibration base signal 11 from an appropriate accelerometer 108 on a machine tool 106 passes into an electrical d.c. filter 12 to remove any d.c. bias. The output signal 13 from filter 12 is divided or branched with a branch part 14 passing into a first MAV filter 15. MAV filter 15 (mean-absolute-value) calculates an approximate RMS value for its input signal. The remaining branch part of signal 13 passes into synchronous filter 16 which passes only the electrical signal frequencies at the tool or spindle harmonics. The output signal 17 from filter 16 is branched with a branch 18 passing to a second MAV filter 19. Synchronous filter 16 is a tracking or locating filter correlated by a spindle tachometer signal 20. The output signals 21 and 22 respectively, of the first and second MAV filters 15 and 19 are comparison processed in processor 23. If the ratio of output signals $$\frac{MAV\,22}{MAV\,21}$$

is less than a predetermined threshold value $TH_1$, the tool condition giving rise to the change in accelerator vibration signals is interpreted to be asynchronous tool chatter and not tool breakage. If asynchronous chatter is not a condition to be further monitored or one requiring cutting process intervention, signal processing ceases. Otherwise, signal processing continues with a branch of signal 17 from synchronous filter 16 together with a cutting edge or insert number signal 24 passing to notch filter 25. Signal output 26 from notch filter 25 is a residual signal which contains mostly low amplitude noise from a normal cutting process but retains most of the noise signal from a cutting edge damaged tool. The ratio of the root means squared (RMS) value of this residual signal to the original signal is small, (45% or less) for normal cuts, but large (75% or more) for broken tool cuts. Accordingly, the residual signal 26 from filter 25 passes to a third MAV filter 27 and its output signal 28 together with a branch signal 29 passes to a comparison processor 30. A ratio of the output signals 28 and 29 of MAV filters 27 and 19, respectively, is calculated in processor 30. If the calculated ratio $$\frac{MAV\,28}{MAV\,29}$$

is greater than a threshold value, $TH_2$, a broken tool is indicated and an appropriate warning signal may be generated for proper intervention into the cutting procedure. In FIG. 1 the broken tool signal is passed from comparator processor 30 to an appropriate signal or alarm means 31 or utilized to energize a machine tool control means. The threshold values $TH_1$ and $TH_2$ are user selected values. $TH_2$ is generally correlated to the noted 45% and 75% values, and with some user adjustability which facilitates adaptation of this invention to specific metal cutting processes and procedures having machining conditions which may cause some variances from the percent values.

Figure 2:
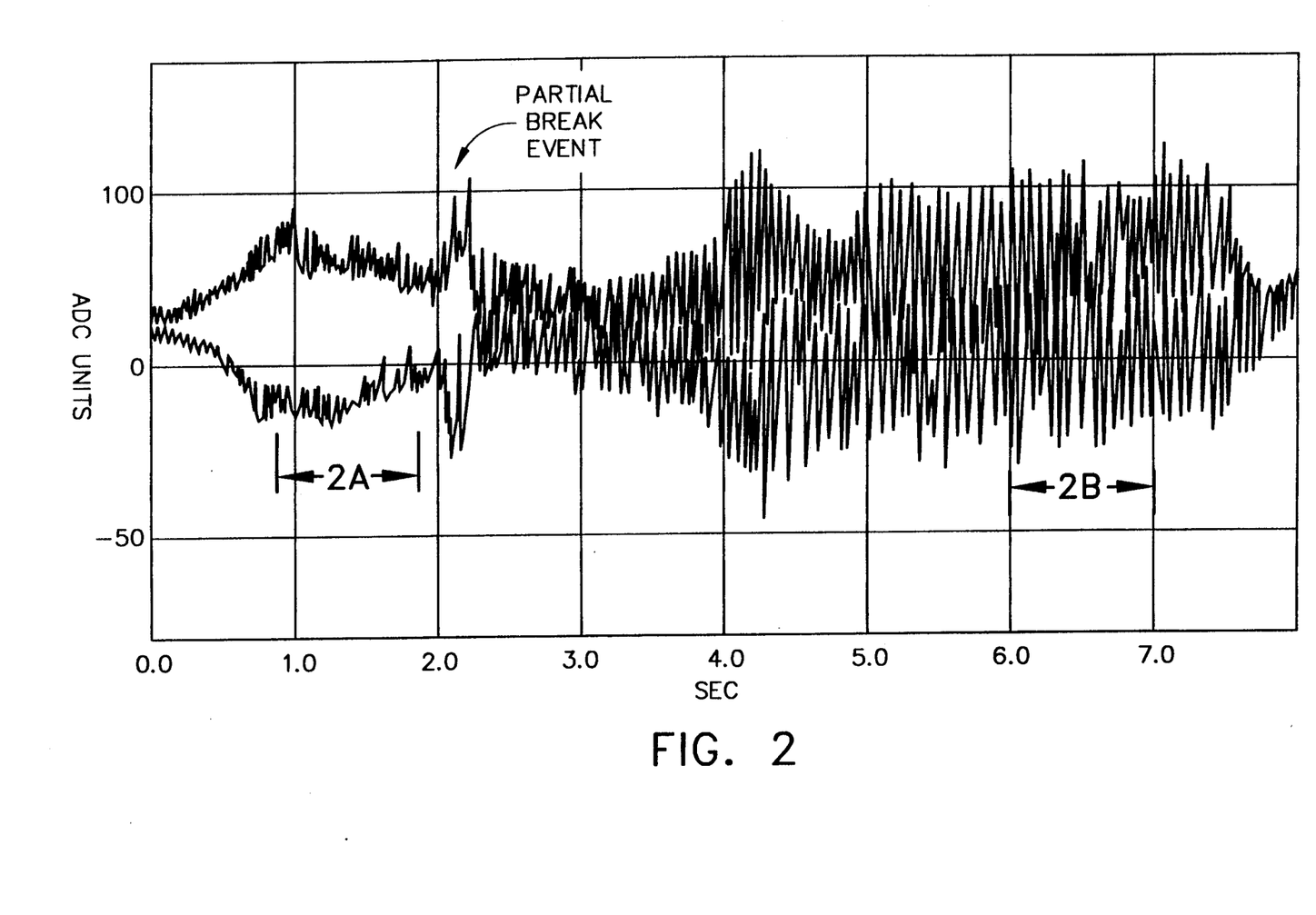
FIG. 2 is a pictorial graph of certain failure event results obtained by a practice of the FIG. 1 system.
Figure 2A:
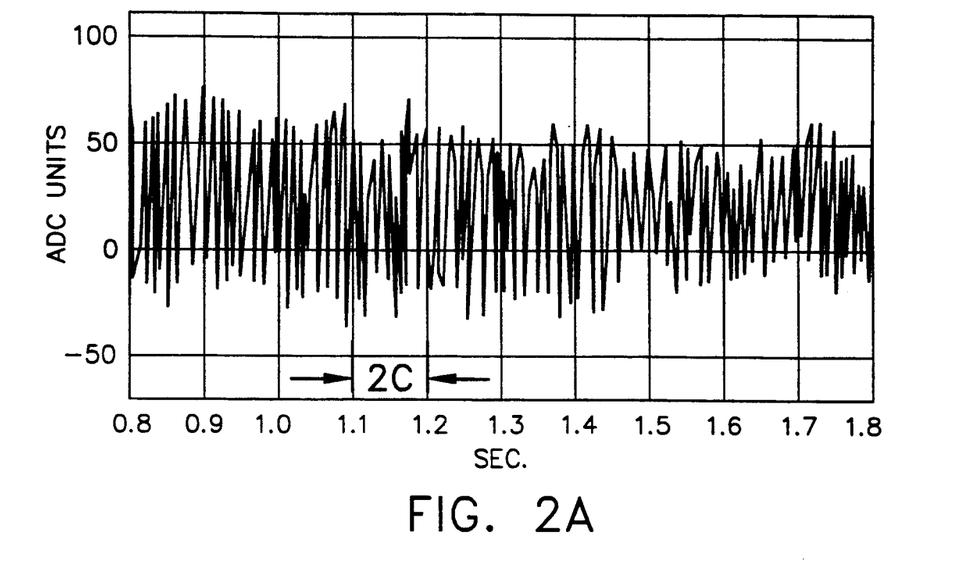
FIG. 2A is a pre-event segment of FIG. 2 amplified to illustrate pre-failure event signals.

FIG. 2 is illustrative of a practice of this invention identifying a broken tool insert 102, specifically a four flute 0.75 inch end mill which was operated at 1388 spindle RPM corresponding to a spindle frequency of 23 Hz and a tooth passing frequency of 92.0 Hz. In this example a partial break occurred at the 2.25 second mark in an 8.0 second recording period. This partial break is further defined by short one second recording segments prior to, FIG. 2A, and subsequent to, FIG. 2B, the tool breaking event. In FIG. 2A the one second record shows a relatively constant compressed signal with well defined periodicity prior to breakage while FIG. 2B shows the same tool as in FIG. 2A operating at the same rotational period but with a significant lack of continuity which suggests that a cutting tool cutting surface has changed.

Figure 2B:
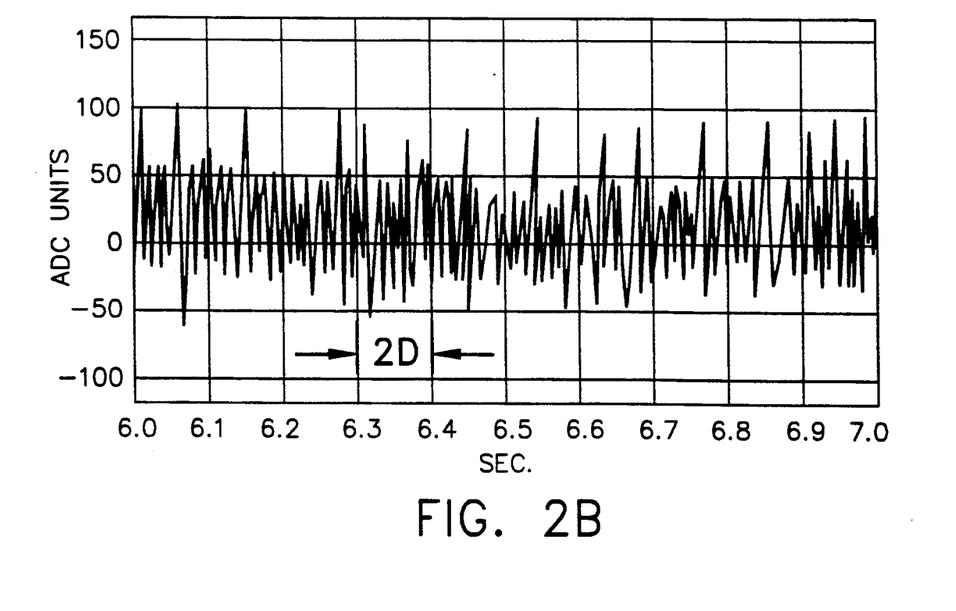
FIG. 2B is a subsequent event segment of FIG. 2 amplified to illustrate a changed signal pattern confirming the failure event.
Figure 2C:
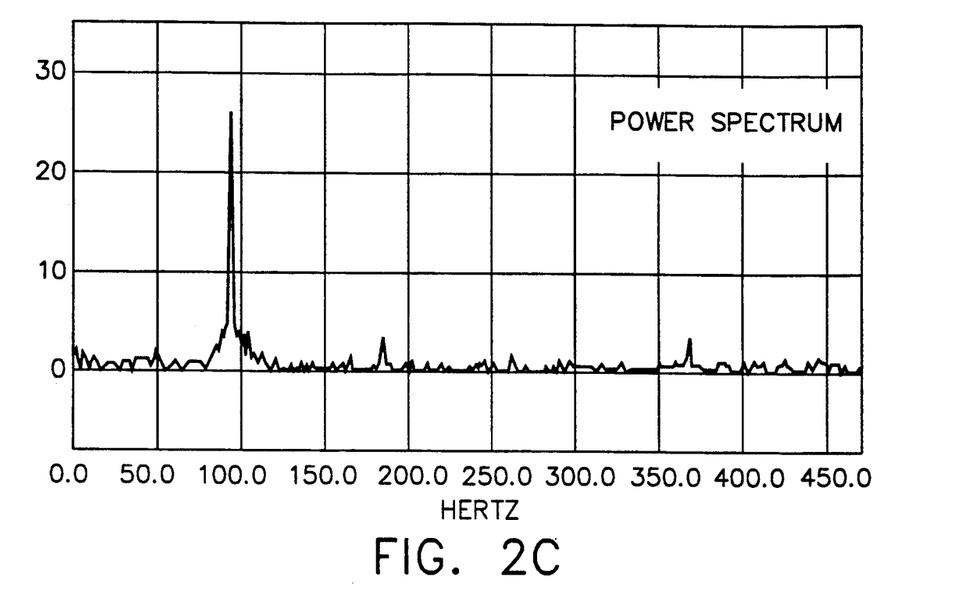
FIG. 2C is a frequency domain plot of FIG. 2A illustrating a predominance of tooth passing harmonics.

FIG. 2C displays the same information as illustrated in FIG. 2A but on a coordinate system of frequency vs. amplitude. A single strong energy band appears at a frequency of about 98 Hz.

Figure 2D:
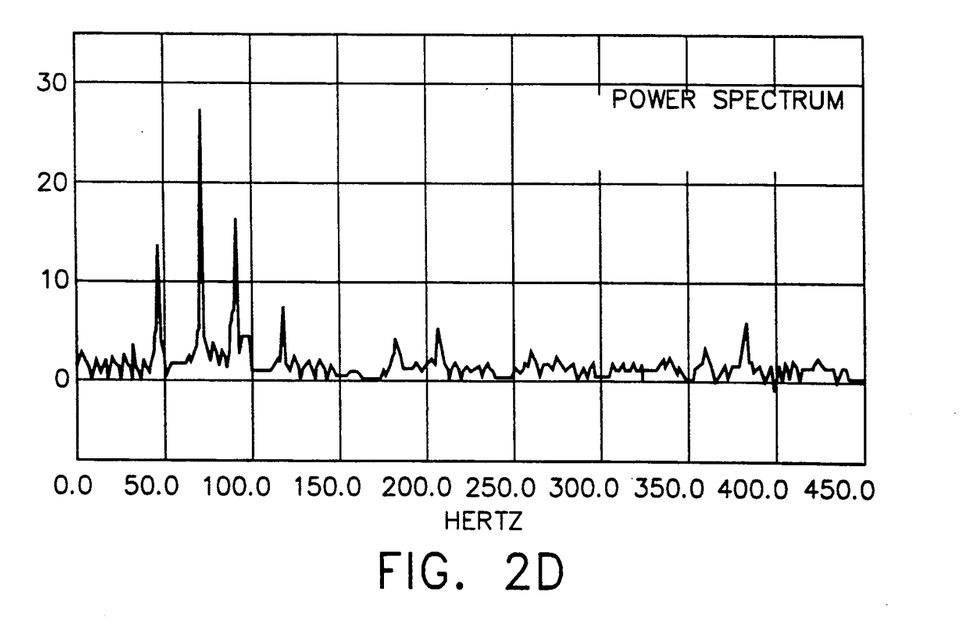
FIG. 2D is a frequency domain plot of FIG. 2A illustrating a shift from tooth to spindle harmonics, caused by the tool failure event.

FIG. 2D shows the same information as that of FIG. 2B. While the expected appearance of the 98 Hz. energy band is present, it is measurably reduced which indicates a significant change in the metal cutting process brought about by a failure of a tool cutting surface.

Breakage conditions are further accentuated in FIGS. 2C and 2D. For example, FIGS. 2C and 2D show a signal shift indicative of the signal passing from tooth harmonics to spindle harmonics which are indicative of cutting with a tool with a broken insert or cutting edge.

Figure 3:
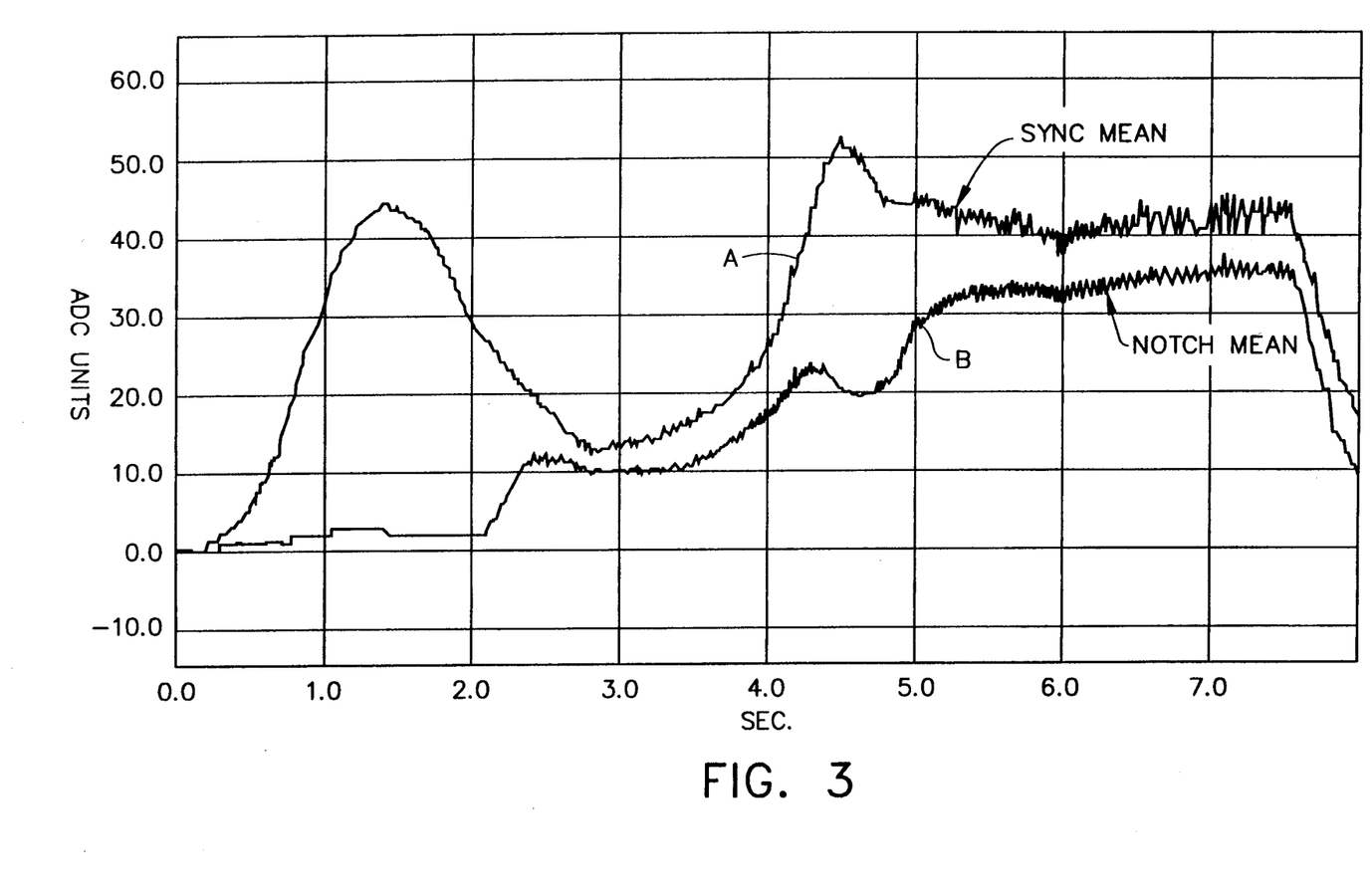
FIG. 3 is a graphical illustration of the output signals of the synchronous and notch filters in the system of FIG. 1 of this invention.

FIG. 3 illustrates the result of processing the electrical signal through the system of this invention.

Referring to FIG. 3, curve A is a synchronous filter processed signal while curve B is a notch filter processed signal. Curve B illustrates that the notch filter 25 has effectively blocked those components of the signal which are not relevant to the abnormal or breakage associated abnormal signal, and passes the abnormal signal for further processing. Curve A illustrates that the synchronous filter selectively passes only those components of the signal corresponding to the spindle frequency and its harmonics.

Figure 4:
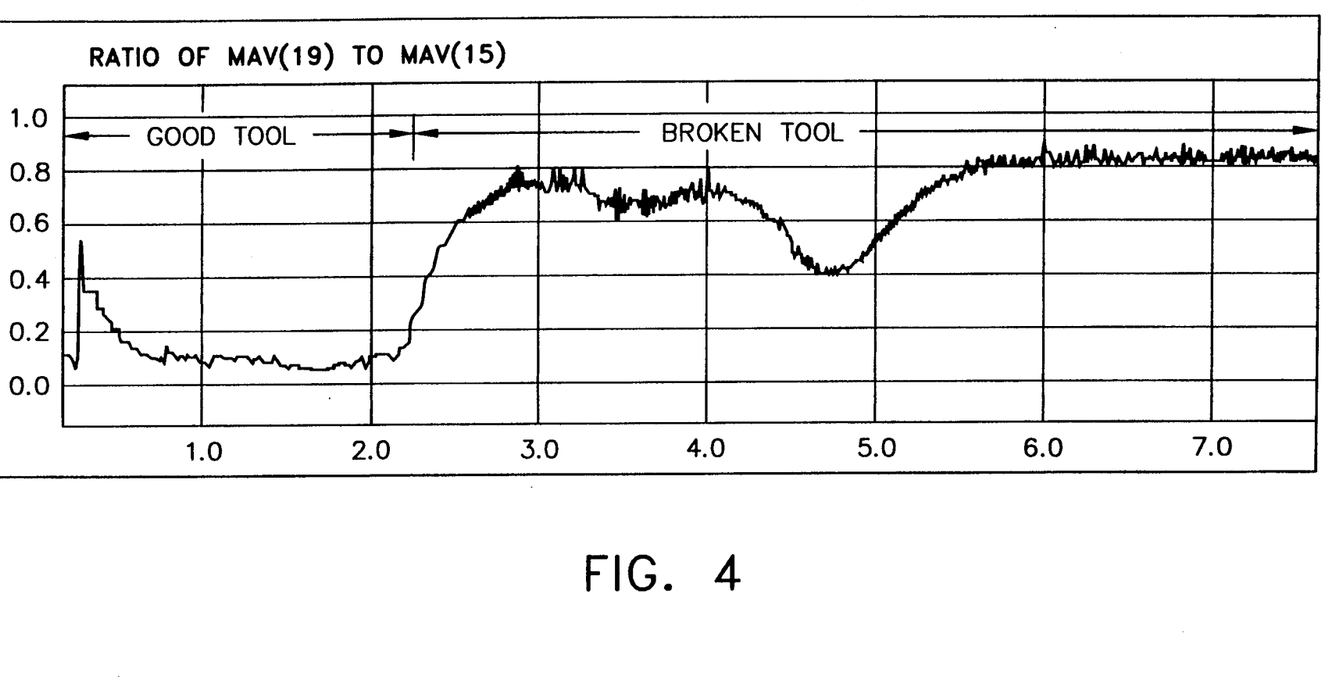
FIG. 4 is a signal curve illustrating the ratio values of the output signals of FIG. 3.

FIG. 4 illustrates the MAV rations of the signals of FIG. 3 and particularly showing a significant change from a low of about 0.2 just preceding the broken tool indication to a high of about 0.4 subsequent to the "good tool to broken tool" transition.

The system of this invention is advantageously employed in timely detecting the loss of one or more cutter inserts or flutes of a metal cutting tool where the loss of one insert is a preliminary failure event to a potential cascading or catastrophic tool loss.

While this invention has been disclosed and described with respect to a preferred embodiment, it will be understood by those skilled in the art that various changes and modifications may be made without departing from the spirit and scope of the invention.

What is claimed is:

1. A method of determining a metal cutting tool failure event during a metal cutting procedure, comprising the steps of:
   (a) obtaining an electrical low frequency forced vibration signal from a cutting tool during its cutting process;
   (b) passing said signal through electronic filters to provide a residual signal;
   (c) electronically determining an RMS value of each of said low frequency signal and said residual signal;
   (d) passing said RMS values into a value comparison processor which determines a ratio value of $$\frac{RMS \text{ residual signal}}{RMS \text{ low frequency signal}} \text{ ; and}$$

(e) generating a tool failure event electrical signal when said ratio value is greater than a predetermined value.

2. The invention as recited in claim 1, wherein said cutting tool is a multiple cutting edge tool and said failure event is a breakage of one cutting edge of said cutting tool.

3. The invention as recited in claim 1, wherein said cutting tool is a multiple cutter insert tool and said failure event is a breakage of one insert of said cutting tool.

4. The invention as recited in claim 1, wherein said cutting tool is mounted in a spindle of a metal cutting machine and said low frequency forced vibration signal is obtained by an accelerometer having a flat response in the range of about 5 to about 1000 Hz., said accelerometer being positioned on said metal cutting machine.

5. The invention as recited in claim 1, wherein said electronic filters include a d.c. filter, a synchronous filter, a notch filter, and an MAV (mean-absolute-value) filter for each RMS determination.

6. A method of detecting a multiple cutting edge metal cutting tool failure event during a metal cutting operation, comprising the steps of:
   (a) generating an electrical low frequency (LF) base signal caused by operation of a cutting tool;
   (b) filtering said LF base signal through a d.c. filter and a first MAV (mean-absolute-value) filter to remove and d.c. bias and to determine a first RMS value signal;
   (c) passing a branch of an output from said d.c. filter together with a tool rotation tachometer signal from said cutting tool through s synchronous filter which only passes an electrical signal of a rotational tool frequency at harmonics of said cutting tool;
   (d) passing a branch of an output signal from said synchronous filter through a second MAV filter to determine a second RMS value signal;
   (e) passing said first and second RMS value signals into a comparison processor to determine a ratio of the signals which provides a first threshold value;
   (f) passing another branch of the output signal from said synchronous filter together with an electrical signal, having a magnitude corresponding to a quantity of cutting edges on said cutting tool, through a multi notch filter to provide a residual signal which will contain any noise present in said LF signal and passed by said d.c. filter and said synchronous filter and caused by said cutting tool if damaged;
   (g) passing the residual signal from said notch filter to a third MAV filter to determine a third RMS value signal;
   (h) passing an output signal from each of said third and said second MAV filters to a comparison processor to determine a ratio of the signals which provides a second threshold value; and
   (i) initiating a tool failure event signal when said second threshold value exceeds a predetermined value.

7. The invention as recited in claim 6, wherein said cutting tool comprises multiple cutting inserts and said tool failure event signal is initiated when a breakage of one of said inserts occurs.

8. A metal cutting tool failure event sensor, comprising:
   means for sensing a vibration in a cutting machine tool having a multiplicity of cutting inserts and for generating a vibration base signal responsive to said sensed vibration;
   a d.c. filter to receive said vibration base signal and to provide a d.c. filter output signal without d.c. bias;
   a first MAV (mean-absolute-value) filter coupled to said d.c. filter to provide an RMS value of said d.c. filter output signal;
   a synchronous filter for receiving a spindle tachometer signal and coupled to said d.c. filter for receiving said d.c. filter output signal, said synchronous filter providing a synchronous filter output signal;
   a second MAV filter coupled to said synchronous filter to provide an RMS value of said synchronous filter output signal;
   a first comparison processor coupled respectively to said first MAV filter and to said second MAV filter to calculate a first ratio defined by said synchronous filter output signal RMS value over said d.c. filter output signal RMS value;

a notch filter coupled to said synchronous filter to provide a residual signal which will contain any noise caused by at least one of said multiplicity of cutting inserts if damaged;

a third MAV filter coupled to said notch filter to provide an RMS value of said residual signal; and a second comparison processor coupled respectively to said second MAV filter and to said third MAV filter to calculate a second ratio defined by said synchronous filter output signal RMS value over said residual signal RMS value, said second comparison processor generating an alarm signal if the second ratio exceeds a predetermined threshold value.

9. The sensor of claim 8, wherein said first comparison processor compares the first ratio to another predetermined threshold value and discontinues signal processing through said notch filter, said third MAV filter and said second comparison processor if the first ratio is less than the other predetermined threshold value.

10. A metal cutting tool failure event sensor, comprising: pl a vibration sensor to sense a vibration in a cutting tool having a multiplicity of cutting inserts and to generate a vibration base signal responsive to said sensed vibration;

a d.c. filter for receiving said vibration base signal and for providing a d.c. filter output signal without d.c. bias;

a synchronous filter for receiving a spindle tachometer signal and coupled to said d.c. filter for receiving said d.c. filter output signal, said synchronous filter providing a synchronous filter output signal;

a first MAV (mean-absolute-value) filter coupled to said synchronous filter to provide an RMS value of said synchronous filter output signal;

a notch filter coupled to sid synchronous filter to provide a residual signal which will contain any noise caused by any one of said multiplicity of cutting inserts being damaged;

a second MAV filter coupled to said notch filter to provide an RMS value of said residual signal; and a first comparison processor coupled respectively to said first MAV filter and to said second MAV filter to calculate a first ratio defined by said synchronous filter output signal RMS value over said residual signal RMS value, said comparison processor generating an alarm signal if said ratio exceeds a predetermined threshold value.

11. The sensor of claim 10, further comprising:

a third MAV (mean-absolute-value) filter coupled to said d.c. filter to provide an RMS value of said d.c. filter output signal; and a second comparison processor coupled respectively to said first MAV filter and said third MAV filter to calculate a second ratio defined by said synchronous filter output signal RMS value over said d.c. filter output signal RMS value and said second comparison processor compares the second ratio to another predetermined threshold value and discontinues signal processing through said notch filter, said second MAV filter and said first comparison processor if the second ratio is less than the other predetermined threshold value.

* * * * *